(12) United States Patent
Sun et al.

(10) Patent No.: US 9,258,275 B2
(45) Date of Patent: Feb. 9, 2016

(54) SYSTEM AND METHOD FOR DYNAMIC SECURITY INSERTION IN NETWORK VIRTUALIZATION

(71) Applicants: Yi Sun, San Jose, CA (US); Meng Xu, Los Altos, CA (US); Jia-Jyi Roger Lian, Saratoga, CA (US); Choung-Yaw Michael Shieh, Palo Alto, CA (US)

(72) Inventors: Yi Sun, San Jose, CA (US); Meng Xu, Los Altos, CA (US); Jia-Jyi Roger Lian, Saratoga, CA (US); Choung-Yaw Michael Shieh, Palo Alto, CA (US)

(73) Assignee: VARMOUR NETWORKS, INC., Santa Clara, CA (US)

( * ) Notice: Subject to any disclaimer, the term of this patent is extended or adjusted under 35 U.S.C. 154(b) by 62 days.

(21) Appl. No.: 13/861,220

(22) Filed: Apr. 11, 2013

(65) Prior Publication Data
US 2013/0276092 A1 Oct. 17, 2013

Related U.S. Application Data

(60) Provisional application No. 61/686,827, filed on Apr. 11, 2012.

(51) Int. Cl.
*G06F 9/00* (2006.01)
*G06F 15/16* (2006.01)
*G06F 17/00* (2006.01)
*H04L 29/06* (2006.01)
*H04L 12/725* (2013.01)
*H04L 12/64* (2006.01)
*H04L 29/08* (2006.01)
*H04L 12/721* (2013.01)
*H04L 12/701* (2013.01)

(52) U.S. Cl.
CPC ........ *H04L 63/0227* (2013.01); *H04L 12/6418* (2013.01); *H04L 45/306* (2013.01); *H04L 45/00* (2013.01); *H04L 45/44* (2013.01); *H04L 67/327* (2013.01)

(58) Field of Classification Search
CPC ............ H04L 63/0227; H04L 12/6418; H04L 45/306; H04L 45/00; H04L 69/16; H04L 69/161; H04L 29/06; H04L 63/20; H04L 67/327; H04L 45/44
USPC .......................................................... 726/13
See application file for complete search history.

(56) References Cited

U.S. PATENT DOCUMENTS

| | | | | |
|---|---|---|---|---|
| 6,253,321 | B1* | 6/2001 | Nikander et al. | 713/160 |
| 8,296,459 | B1* | 10/2012 | Brandwine et al. | 709/241 |
| 2012/0113989 | A1* | 5/2012 | Akiyoshi | 370/392 |
| 2013/0223226 | A1* | 8/2013 | Narayanan et al. | 370/236 |

* cited by examiner

*Primary Examiner* — Shewaye Gelagay
*Assistant Examiner* — Amie C Lin

(57) ABSTRACT

A method and apparatus for dynamic security insertion into virtualized networks is described. The method may include receiving, at a network device from a second network device, a data packet and application data extracted from the data packet. The method may also include generating a routing decision for a network connection associated with the data packet based, at least in part, on the application data. Furthermore, the method may include transmitting the routing decision for the data packet to the second device for the second device to route the data based on the routing decision.

21 Claims, 5 Drawing Sheets

SYSTEM AND METHOD FOR DYNAMIC SECURITY INSERTION IN NETWORK VIRTUALIZATION

RELATED APPLICATION

The present invention claims priority to U.S. Provisional Patent Application No. 61/686,827 filed Apr. 11, 2012, and incorporates that application by reference in its entirety.

TECHNICAL FIELD

Embodiments of the invention relate to the field of communication, and more particularly, to application of security to network virtualization.

BACKGROUND

Computing networks are becoming ubiquitous in enterprises, providing secure and cost-effective access to resources. Those networks usually have one or more controllers, each controller supporting a plurality of routers, network switches, wireless access points (AP), etc. deployed through the enterprise. A wireless fidelity (WiFi) network operating in accordance with IEEE 802.11 standards is an example of such a network.

In order to meet the demands of enterprises, physical computing networks may be logically divided into several virtual networks. A virtual network, such as a virtual local area network (VLAN), consists of virtual connections between network resources. Through the process of network virtualization, different virtual networks, the resources on those virtual networks, the network communication between devices on those virtual networks, etc. can be segregated from one another, even though they share the same physical resources.

One major problem associated with network virtualization involves network security. Traditional network security often relies on the physical interconnection between devices and the communication protocols that support those connections. Thus, traditional network security devices, which rely on traditional network data communication techniques, do not work in the virtual network environment.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Figure 1:
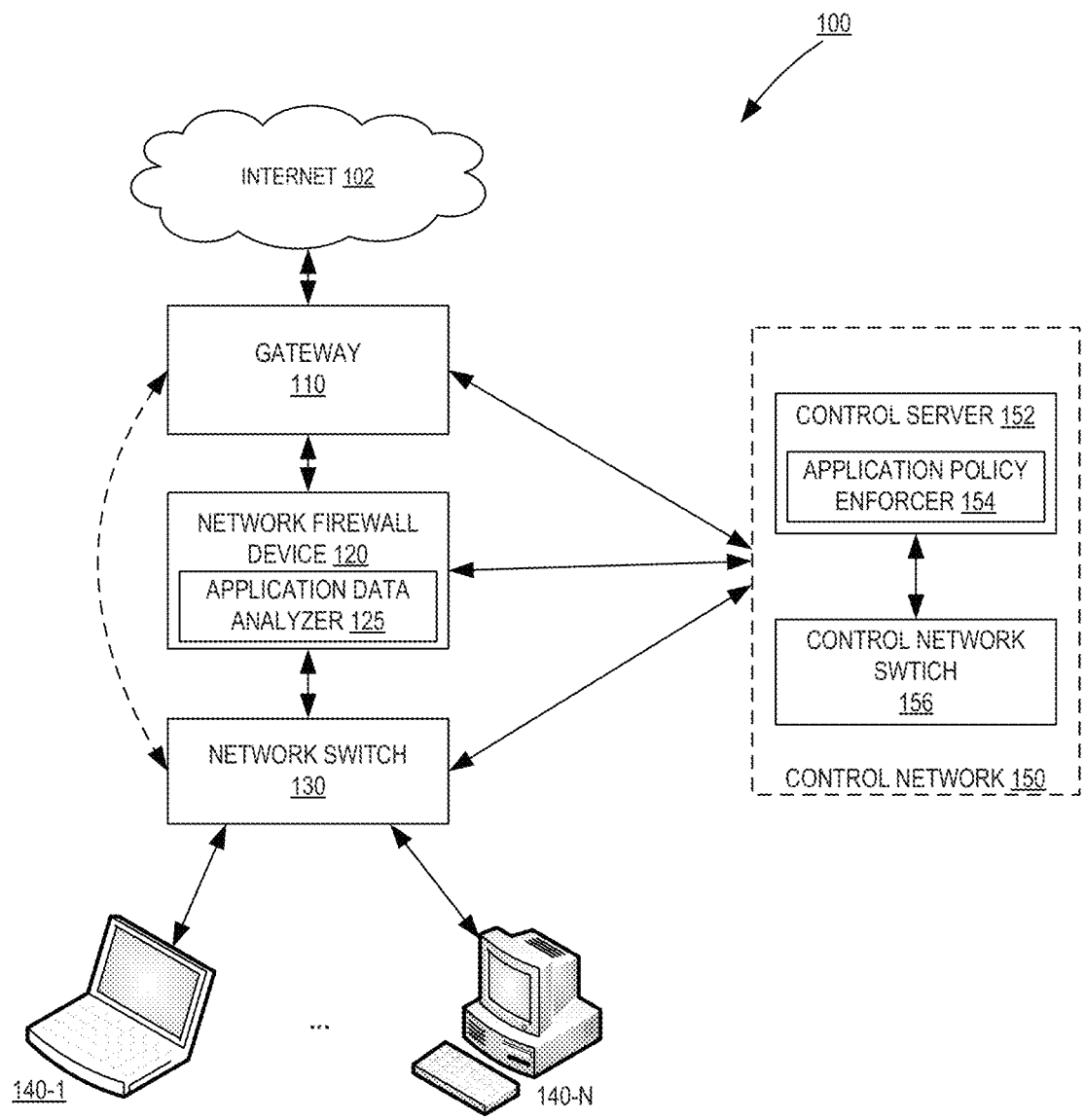
FIG. 1 is a block diagram of exemplary system architecture for dynamic security insertion in a virtualized network environment.

FIG. 1 is a block diagram of exemplary system architecture for dynamic security insertion in a virtualized network environment. System architecture illustrates a network 100 that includes a plurality of network devices, such as gateway 110, network firewall device 120, and network switch 130. In one embodiment, the system architecture further includes a control network 150 coupled with the network. In one embodiment, the control network 150 includes a control server 152 and a control switch 156. Although only a single gateway, network firewall device, network switch, control server, and control network switch are illustrated, the network 100 and network 150 illustrated by system architecture may include one or more of each of the different network devices consistent with the discussion herein.

In one embodiment, the control server 152 of control network 150 supports devices such as gateway 110, network firewall device 120, and network switch 130 to enable communication channels within the network 100 that allow sharing of resources and information over the network 100, and with additional networks, such as the internet 102. In one embodiment, control server 152 provides networking across wireless and wired network connections, VPN connections, and remote services, and integrates a networking and security functions into the network infrastructure and user experience, as will be discussed herein.

The network 100 and control network 150, as referred to and discussed herein, may run on one Local Area Network (LAN) and may be incorporated into the same physical or logical system, or different physical or logical systems. Alternatively, network 100 and control network 150 may reside on different LANs, wide area networks, etc. that may be coupled together via the Internet 102 but separated by firewalls, routers, and/or other network devices. It should be noted that various other network configurations can be used including, for example, hosted configurations, distributed configurations, centralized configurations, etc.

The system architecture further includes one or more client computing devices 140-1 through 140-N coupled to the network 100 via network switch 130. Client computing devices 120 connect to the network switch 130 to access services such as the Internet 102 through gateway 110.

In one embodiment, gateway 110, network firewall device 120, network switch 130, control server 152, and control network switch 156 are purpose-made digital devices, each containing a processor, memory hierarchy, and input-output interfaces. In one embodiment of the invention, a MIPS-class processor such as those from Cavium or RMI is used. Other suitable processors, such as those from Intel or AMD may also be used. The memory hierarchy traditionally comprises fast read/write memory for holding processor data and instructions while operating, and nonvolatile memory such as EEPROM and/or Flash for storing files and system startup information. Wired interfaces are typically IEEE 802.3 Ethernet interfaces, used for wired connections to other network devices such as switches, or to a controller. Wireless interfaces may be WiMAX, 3G, 4G, and/or IEEE 802.11 wireless interfaces. In one embodiment of the invention, the gateways, controllers, switches, and firewalls, and wireless APs operate under control of an operating system, such as a LINUX™-based operating system, with purpose-built programs providing networking functionality.

Client computing devices 140-1 through 140-N also contain a processor, memory hierarchy, and a number of interfaces including a wired and/or wireless interfaces for communicating with network switch 130. Typical client computing devices include personal computers, handheld and tablet computers, Wi-Fi phones, wireless barcode scanners, and the like.

In one embodiment, control server 152 provides a centralized source for virtualization of network 100 to enable one or more logical networks to be run on network 100 (i.e., multiple logical networks to be run on the same physical network resources). In one embodiment, control server 152 and control network switch 156 implement a network virtualization protocol, such as OPENFLOW™, SOFTWARE DEFINED NETWORK™, OPENSTACK QUANTUM™, etc., to enable the network virtualization. Furthermore, the network devices, such as gateway 110, network firewall device 120, and network switch 130 also implement the network virtualization protocol to enable communication with one another, as well as with the network devices of the control network 150.

In prior network devices, such as routers or switches, packet forwarding and high level routing decisions occurred on the network device. However, in the embodiments discussed herein, the control server 152 separates these two functions. The network devices, such as network switch 130, network firewall device 120, and gateway 110 still provide data routing, but control server 152 provides a centralized entity for determining network routing decisions. In one embodiment, the control server 152 communicates the routing decisions to the network devices via control network switch 156 using the network virtualization protocol. In one embodiment, the routing decisions are forward by the control server 152 to the network devices in the form of a flow table. A flow table provides each network device with the control server 152 determined routing decisions for a virtualized network. The routing decisions may be determined by control server 152, and embodied in a flow table, based on such considerations as distribution of virtual networks over physical resources, load balancing, etc. The flow tables may include entries that contain a set of data packet fields (i.e., device media access control identifier, connection identifier, etc.) to match, and an action, such as send-out-port, modify-field, drop, etc. to be performed by the network device making the match.

In one embodiment, when a network device, such as gateway 110, network firewall device 120, and network switch 130 that implement the network virtualization protocol, receives a data packet it has not seen before (e.g., a new connection by client device 140-1), and for which there are no matching flow entries in a flow table, the network device sends the packet to the control server 152. The control server 152 then makes a decision on how to handle this packet. For example, the control server 152 can determine that the network device should drop the packet, or add a flow table entry directing the network device on how to forward similar packets in the future. The control server then sends the network device an updated flow table with the flow decision(s) for handling future data packets based on the decision.

In one embodiment, application policy enforcement 154 of control server 152 makes additional routing decisions for network data based on application data associated with data packets. Although the network firewall device 120 is discussed herein as detecting, extracting, and transmitting application data from data packets to control server 152, any network device may perform the techniques discussed herein. In one embodiment, network firewall device 120 inspects data packets to control incoming and outgoing network traffic by analyzing the data packets to determine whether it should be allowed through or not, typically based on a predetermined rule set. However, the network firewall device 120 only performs the data packet inspection for security purposes. In one embodiment, network firewall device 120 utilizes an application data analysis 125 module to perform security processing and deep packet inspection on incoming and outgoing data packets. When a data packet belongs to a new connection, and the data packet is to be forwarded to control server 152 for generation of a routing decision, in one embodiment, application data analysis 125 includes the results of the security processing and deep packet inspection to additionally transmit application specific data to the control server 152. In one embodiment, application policy enforcer 154 of control server 152 may make one or more policy based routing decisions for a virtualized network based on the application data. The policy based routing decisions may be based on the identity of an application generating the data, purpose of the data within a data packet, content of the data within a data packet, security risks associated with the data or connection, etc. In one embodiment, the policy and application specific routing policies may be predefined at application policy enforcer 154. In another embodiment, the policy and application specific routing policies may be defined by a user, such as a network administrator, responsible for network 100.

The application policy enforcer 154 may then embed the routing decisions in a new, or updated, flow table, which can be distributed to network firewall device 120, as well as other devices in network 100 (e.g., gateway 110 and network switch 130). Then, each network device, and not just network firewall device 120, may make policy based routing decisions, based on a flow table distributed by control server 152.

For example, network firewall device 120 may receive data packets from network switch 130, and that originated at client 140-1. The network firewall device 120 performs security processing and deep packet inspection on the data packets and determines that this is a new connection and that the data packets include a request for adult content, data from a social networking website, video streaming site, etc. The control server 152 would receive the data packets and the application data, which is indicative of the content, purpose, and/or application associated with the data packets, extracted by application data analyzer 125. The control server 152 could then decide to drop the data packets for this connection or client device, and embed this decision in flow tables that are to be distributed to one or more network devices. Once the flow tables are distributed to the network devices, each network device can enforce the control server's 152 routing decision, which is based in part on the application specific data extracted from data packets. In one embodiment, the firewall device 120 may support the protocol of control server 152, and perform packet forwarding based on the routing decision from control server 152.

As another example, network firewall device 120 may again receive data packets from network switch 130, and that originated at client 140-N. The network firewall device 120 again performs security processing and deep packet inspection on the data packets and determines that this is a new connection and that the data packets originated from a computer system, or application, associated with a specific user. The policy based routing decision of application policy enforcer 154 may determine that based on the identity of the specific user associated with the data packet and/or connection, the connection should be given priority routing. Thus, the flow tables generated by control server 152 and distributed to network devices can embed the priority routing in the flow tables. As a result, network switch may bypass network firewall 120 when routing data traffic from client 140-N, based on the flow table giving client 140-N priority routing.

Therefore, the routing decisions of control server 152, which are distributed to network devices in the form of flow tables, may be based on data extracted from the data packets being routed over a virtualization of network 100. In the examples discussed above, a network firewall device 120 performed security processing and deep packet inspection on data packets, and forward results of the security processing and deep packet inspection to the control server 152. The control server 152 is then enabled to make centralized routing decisions for network virtualization based, not only on available physical resources and logical network configurations, but on additional factors such as network security, user identities associated with data packets, destination of the data packets, type of requested data, type of request, websites associated with a request, etc. The routing decisions may then be dynamically inserted into the flow tables distributed to the network devices of network 100 as well of firewall device 120, so that each network device, including firewall device 120, can enforce the control server's 152 centralized routing decisions. Therefore, in the embodiments discussed herein, the architecture provides a consistent forwarding decision across network devices and firewall devices of network 100.

Figure 2:
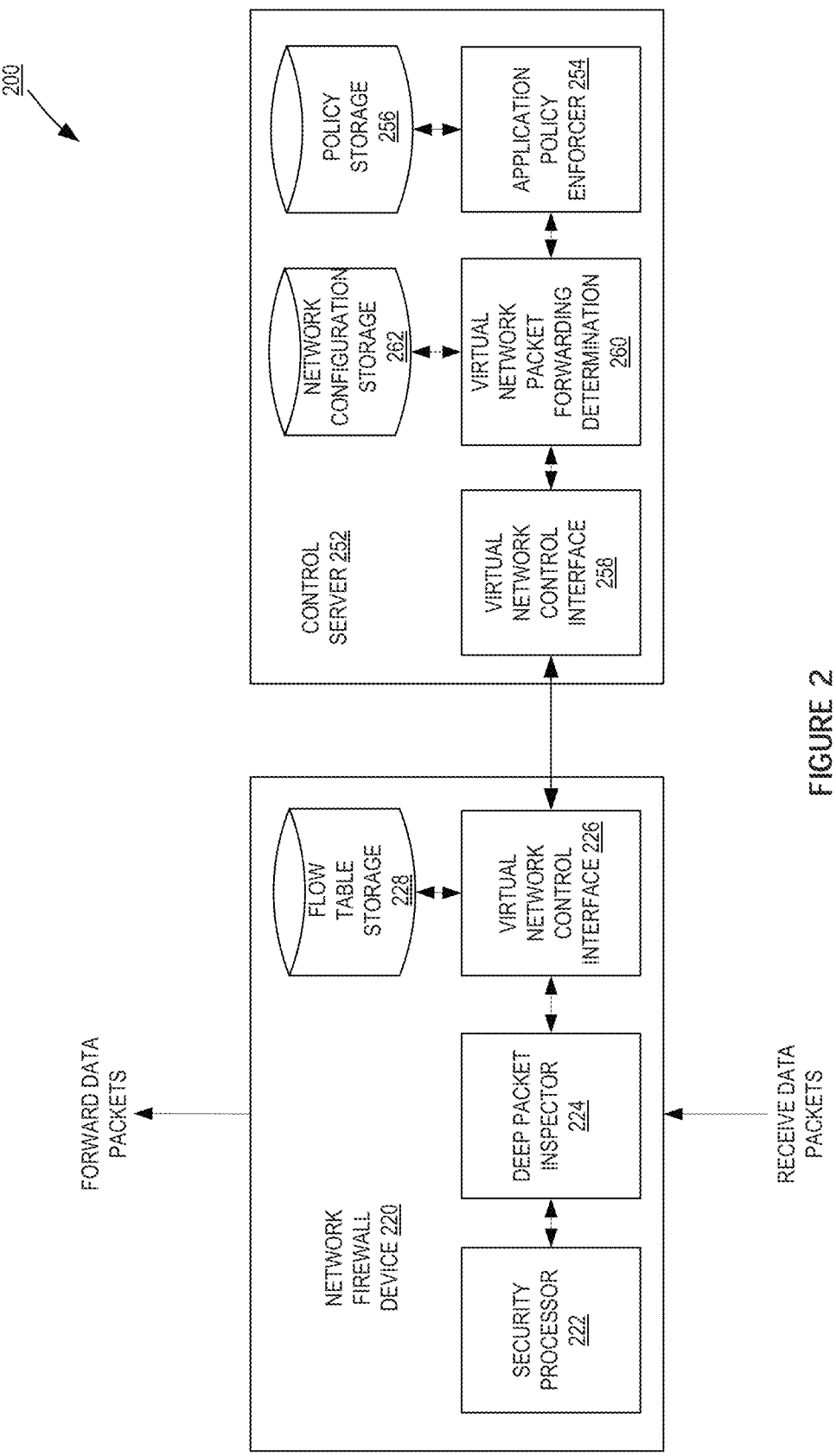
FIG. 2 is a block diagram of one embodiment of a network firewall device and a virtual network control server.

FIG. 2 is a block diagram of one embodiment 200 of a network firewall device 220 and a control server 252. Network firewall device 220 and a control server 252, as illustrated in FIG. 2, provide additional details for the network firewall device 120 and a control server 152 discussed above in FIG. 1.

In one embodiment, network firewall device 220 includes a security processor 222, deep packet inspector 224, virtual network control interface 226, and flow table storage 228. Control server 252 includes its own virtual network control interface 258, virtual network packet forwarding determination engine 260, network configuration storage 262, application policy enforcer 254, and policy storage 256.

In one embodiment, network firewall device 220 is a network device that is responsible for receiving data packets from another network device (not shown), and forwarding the data packets to a destination network device (not shown). Although the discussion herein is directed to a network firewall device, any network device capable of processing data packets in a virtualized network may perform the techniques as discussed herein.

In one embodiment, when network firewall device 220 receives a data packet for forwarding to another network device, security processor 222 intercepts the data packet, and forwards the data packet to the deep packet inspector 224. Deep packet inspector 224 then examines the data portion and header portion of the data packet, searching for virtual network protocol compliance, viruses, spam, intrusions, destination identity, application type, etc. Deep packet inspector 224 therefore examines a packet to determine application data that is indicative of security information associated with the data and/or connection that generated the data. This information, as well as the data packet, is provided to virtual network control interface 226.

Virtual network control interface 226, determines whether the data packet is associated with a new connection or an existing connection by consulting flow table storage 228. The flow table storage 228 stores flow tables received from control server 252, and which include decisions for routing data over a virtual network. Virtual network control interface 226 determines if the flow table includes an entry for the connection, which would indicate an existing connection for which a routing decision already exists. If there is an entry in a flow table associated with the connection, network firewall device 220 forwards the packet according to the flow table. However, when there is no existing entry in a flow table at storage 228, virtual network control interface 226 forwards the data packet and the information gathered and extracted by deep packet inspector 224.

Virtual network control interface 258 receives the data packet and information (e.g., inspection results concerning the existence of virtual network protocol compliance, viruses, spam, intrusions, destination identity, application type, etc.) from network firewall device 220, where the data packet is for a new connection. In order to determine how to route the data packet, virtual network packet forwarding determination engine 260 consults network configuration storage 262 and application policy enforcer 254.

Virtual network packet forwarding determination engine 260, consults a current configuration of a network for which it controls/manages. In one embodiment, control server stores current network configurations for virtual networks in network configuration storage 262. The network configuration storage 262 may include physical resources available in a network, interconnection of those resources, existence and distribution of logical networks with respect to the physical resources, network device identities, etc.

Virtual network packet forwarding determination engine 260 further provides the information extracted by network firewall device 220 from the data packet to application policy enforcer 254. Application policy enforcer 254 may then analyze the extracted information with respect to one or more policies (i.e., security policies, data loss prevention policies, adult content access policies, website access policies, media access policies, policies applicable to specific users/devices, etc.) stored in policy storage 256. In one embodiment, the policies may be a set of predefined network routing policies, or may be user defined. For example, policy storage 256 may include a set of basic security policies that can be modified, changed, added to, etc. by a network administrator. In one embodiment, application policy enforcer 254 provides a user interface, such as a web based graphical user interface for receiving policy specifications from a user.

Virtual network packet forwarding determination engine 260 then receives the application policy enforcer 254 policy determination results, and current network configuration, and generates a routing decision. The routing decision, in one embodiment, is embodied in a flow table. As discussed herein, the flow table provides a set of routing decisions for use by a network device. The flow table may be a new flow table, or an update to an existing flow table. In either case, virtual network control interface 258 transmits the flow table to virtual network control interface 226 of network firewall device 220.

Virtual network control interface 226 installs the flow table in network firewall device 220 and stores the received flow table in flow table storage 228. In one embodiment, virtual network control interface 226 further processes a routing decision for the received data packet, based on the flow table. As discussed herein, that routing decision may embody one or more policy based routing decisions, such as policies based on security, user identity, traffic destination, etc. The data packet is then either forwarded by network firewall device 220 to a next device in a network based on one or more actions specified in the flow table, or dropped.

In the embodiments discussed herein, a flow table is generated by control server 252 based on a network's physical and virtual configurations, as well as on application data extracted from a data packet. That application data may be application data relevant to network security, media access policies, website access policies, content policies, etc. The resulting flow table generated by control server 252 embeds one or more policy based routing decisions for the data packet, and additional data packets that originate from the same connection. The flow tables that embody the policy based routing decisions for the data packet, and connection, are forwarded to a plurality of network devices and firewall devices. Thus, each network device or firewall device in a network may dynamically receive and enforce the centralized routing decisions of the control server. As such, each of the network devices or firewall device may dynamically enforce security policies, media access policies, website access policies, etc. in a virtualized network environment.

Figure 3A:
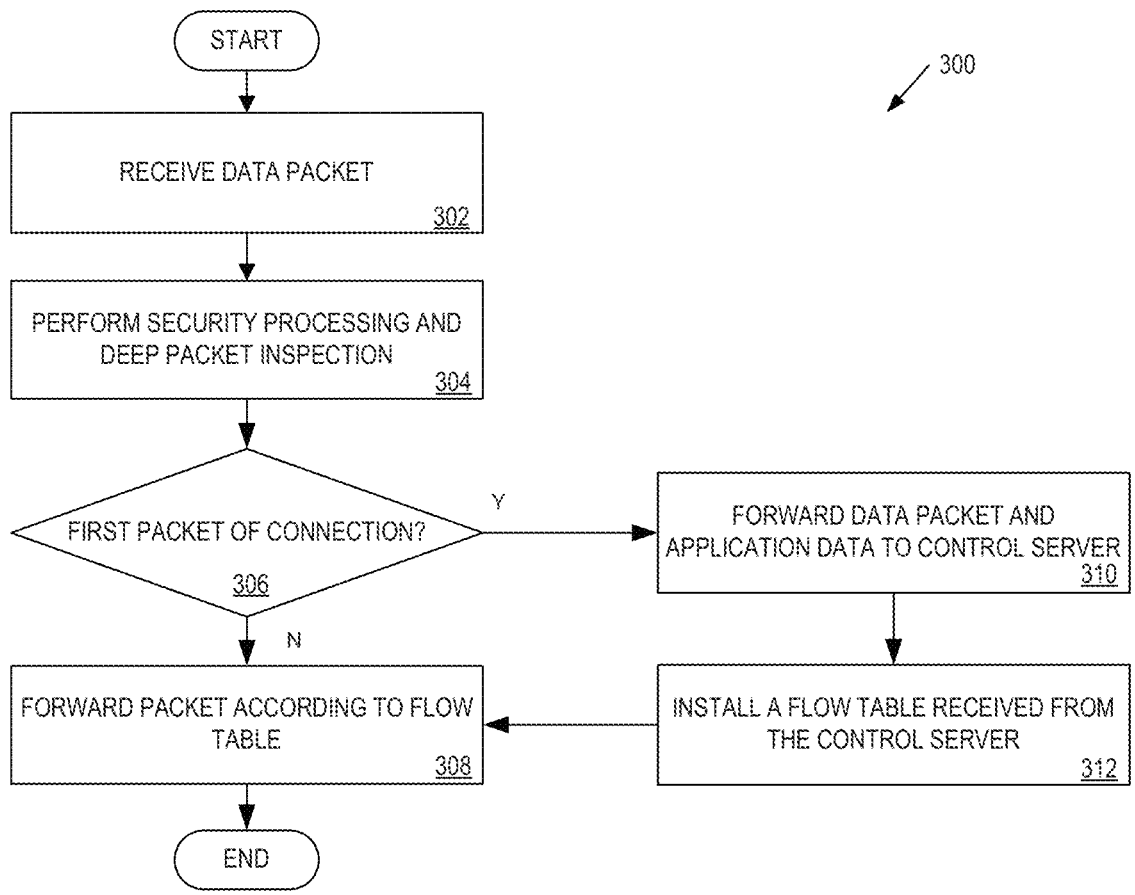
FIG. 3A is a flow diagram of one embodiment of a method for a network device inspecting and routing data based on a flow table.

FIG. 3A is a flow diagram of one embodiment of a method 300 for detecting a rogue router in a computing network. The method 300 is performed by processing logic that may comprise hardware (circuitry, dedicated logic, etc.), software (such as is run on a general purpose computer system, networking device, or other dedicated machine), firmware, or a combination. In one embodiment, the method 300 is performed by network firewall device 120 or 220.

Referring to FIG. 3, processing logic begins by receiving a data packet (processing block 302). As discussed herein, the data packet is received at a network device, such as a network firewall device, for analysis and forwarding to another network device, such as a gateway, switch, access point, etc. Processing logic then performs security processing and deep packet inspection on the data packet to extract application data from the packet (processing block 304). In one embodiment, the security processing and deep packet inspection of the data packet is performed by processing logic to extract application data from the packet by examination of the data portion and header portion of the data packet for virtual network protocol compliance, presence of viruses, presence of spam, likely intrusions, device identity, destination identity, application type that generated the data packet, media access request type, etc.

Processing logic determines whether the data packet if the first packet of a new connection (processing block 306). When the packet does not belong to a new connection, processing logic forwards the data packet according to a flow table (processing block 308). In one embodiment, the flow table includes one or more entries that contain a set of data packet fields (i.e., device media access control identifier, connection identifier, etc.) to match, and an action, such as send-out-port, modify-field, drop, etc. to be performed on the data packet. As discussed herein, the flow table may have one or more security, access, user, etc. based routing policies embedded within the routing decision of the flow table.

When the packet does belong to a new connection, such as when a client device joins a network, opens a web browser, seeks access to a network resource, etc., processing logic forwards the data packet and application data extracted from the data packet to a control server (processing block 310).

Figure 3B:
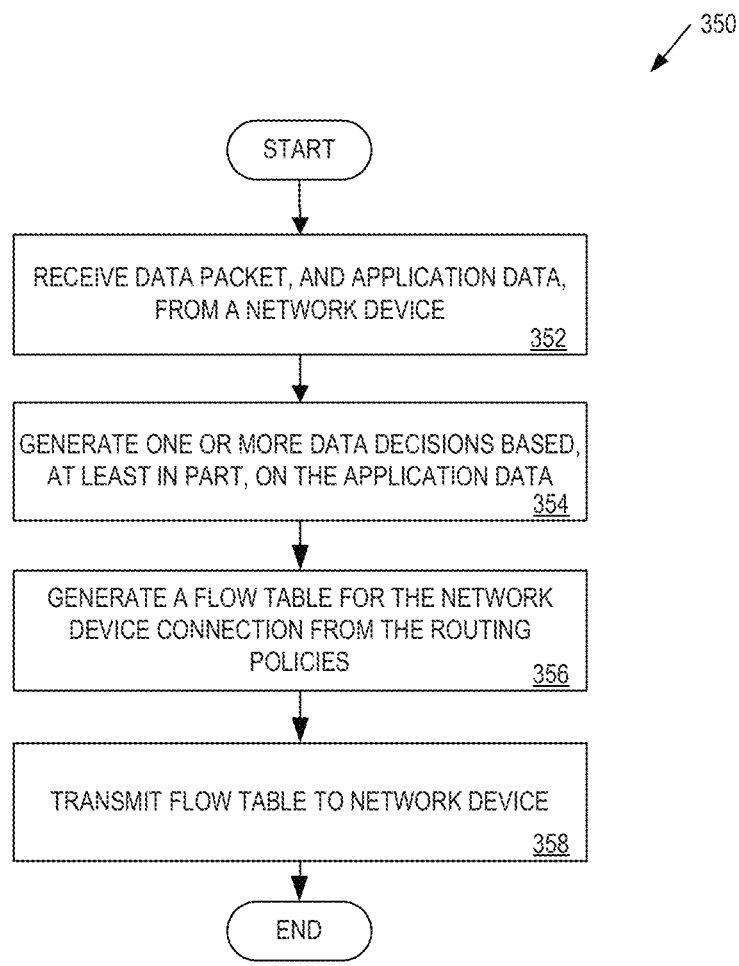
FIG. 3B is a flow diagram of one embodiment of a method for a control server generating a flow table based on application and policy data.

With reference to FIG. 3B, a flow diagram of one embodiment of a method 350 for a control server generating a flow table based on application and policy data is described. The method 350 is performed by processing logic that may comprise hardware (circuitry, dedicated logic, etc.), software (such as is run on a general purpose computer system, networking device, or other dedicated machine), firmware, or a combination. In one embodiment, the method 300 is performed by control server 152 or 252.

Processing logic receives a data packet, and application data, from a network device (processing block 352). As discussed above, the application data may indicate virtual network protocol compliance, presence of viruses, presence of spam, likely intrusions, device identity, destination identity, application type that generated the data packet, media access request type, etc. Processing logic then generates one or more data routing decision based, at least in part, on the application data (processing block 354). The data routing decisions may be policy based decisions that are determined from the application data. For example, the application data extracted from a data packet may indicate the packet is requesting content from a social network website. The corresponding policy may indicate that access to the social network website should be blocked. The resulting routing decision may therefore indicate that the packets for the connection should be dropped. As another example, the application data extracted from a data packet may indicate the packet is generated by an application associated with a corporate CEO. The corresponding policy may indicate that access associated with this particular user should be given priority routing. The resulting routing decision may therefore indicate a preferred routing address, may give the data packet priority in a data queue, may indicate that the packet may be forwarded without security processing, etc.

Processing logic generates a flow table that encapsulates the routing decisions for the connection (processing block 356). The flow table may be a new flow table, when one does not exist for a destination network device. The flow table may also be an update to an existing flow table. Furthermore, the generated flow table may change existing routing decisions for a connection, based on updated application data received from the same or different network device. Processing logic then transmits the flow table to the network device (processing block 358).

Referring again to FIG. 3A, processing logic installs the flow table received from the control server (processing block 312). Processing logic may then forward the data packet according to the flow table (processing block 308).

Figure 4:
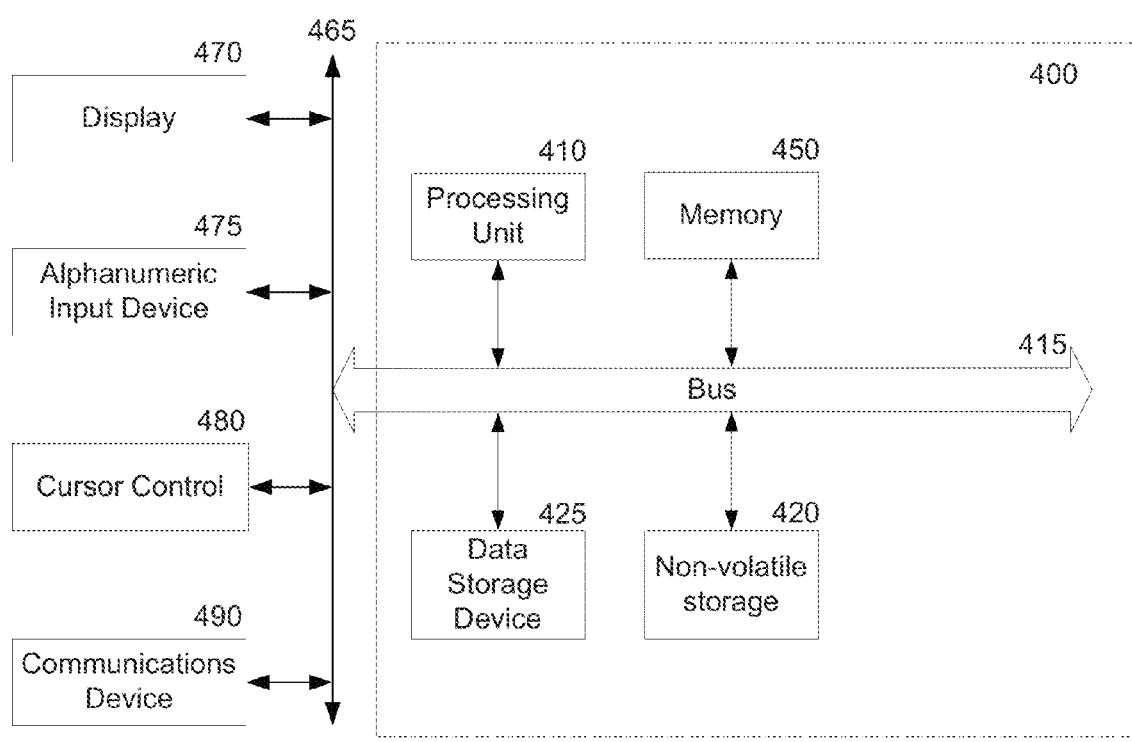
FIG. 4 illustrates a diagrammatic representation of a machine in the exemplary form of a computer system.

FIG. 4 is one embodiment of a computer system that may be used with the present invention. It will be apparent to those of ordinary skill in the art, however that other alternative systems of various system architectures may also be used.

The computer system illustrated in FIG. 4 includes a bus or other internal communication means 415 for communicating information, and a processor 410 coupled to the bus 415 for processing information. The system further comprises a random access memory (RAM) or other volatile storage device 450 (referred to as memory), coupled to bus 415 for storing information and instructions to be executed by processor 410. Main memory 450 also may be used for storing temporary variables or other intermediate information during execution of instructions by processor 410. The system also comprises a read only memory (ROM) and/or static storage device 420 coupled to bus 415 for storing static information and instructions for processor 410, and a data storage device 425 such as a magnetic disk or optical disk and its corresponding disk drive. Data storage device 425 is coupled to bus 415 for storing information and instructions.

The system may further be coupled to a display device 470, such as a cathode ray tube (CRT) or a liquid crystal display (LCD) coupled to bus 415 through bus 465 for displaying information to a computer user. An alphanumeric input device 475, including alphanumeric and other keys, may also be coupled to bus 415 through bus 465 for communicating information and command selections to processor 410. An additional user input device is cursor control device 480, such as a mouse, a trackball, stylus, or cursor direction keys coupled to bus 415 through bus 465 for communicating direction information and command selections to processor 410, and for controlling cursor movement on display device 470.

Another device, which may optionally be coupled to computer system 400, is a communication device 490 for accessing other nodes of a distributed system via a network. The communication device 490 may include any of a number of commercially available networking peripheral devices such as those used for coupling to an Ethernet, token ring, Internet, or wide area network. The communication device 490 may further be a null-modem connection, or any other mechanism that provides connectivity between the computer system 400 and the outside world. Note that any or all of the components of this system illustrated in FIG. 4 and associated hardware may be used in various embodiments of the present invention.

It will be appreciated by those of ordinary skill in the art that any configuration of the system may be used for various purposes according to the particular implementation. The control logic or software implementing the present invention can be stored in main memory 450, mass storage device 425, or other storage medium locally or remotely accessible to processor 410.

It will be apparent to those of ordinary skill in the art that the system, method, and process described herein can be implemented as software stored in main memory 450 or read only memory 420 and executed by processor 410. This control logic or software may also be resident on an article of manufacture comprising a computer readable medium having computer readable program code embodied therein and being readable by the mass storage device 425 and for causing the processor 410 to operate in accordance with the methods and teachings herein.

The present invention may also be embodied in a special purpose appliance including a subset of the computer hardware components described above. For example, the appliance may include a processor 410, a data storage device 425, a bus 415, and memory 450, and only rudimentary communications mechanisms, such as a small touch-screen that permits the user to communicate in a basic manner with the device. In general, the more special-purpose the device is, the fewer of the elements need be present for the device to function.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "transmitting", "receiving", "generating", "identifying", "determining", "disabling", or the like, refer to the actions and processes of a computer system, or similar electronic computing devices, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

We claim:

1. A computer-implemented method comprising:
    receiving, at a network device from a second network device comprising a network firewall device, a data packet and application specific data extracted by the network firewall device from security processing and deep packet inspection of contents of the data packet, the data packet received from a client device having a new network connection for which there are no matching entries in a flow table of the network firewall device, wherein the application specific data determined by the network firewall device during the deep packet inspection and the security processing comprises data indicative of at least: an application that generated the data packet, content of the data packet extracted by the network firewall device during the deep packet inspection, and a purpose of data within the packet;
    generating a routing decision by the network device for the new network connection associated with the data packet received from the client device, the routing decision generated based, at least in part, on application of a policy to a combination of the application, content, and purpose associated with the application specific data; and transmitting the routing decision from the network device to the network firewall device to enable the network firewall device to analyze the application specific data extracted from contents of the data packet and route the data packet based on the routing decision of the network device.

2. The method of claim 1, wherein generating the routing decision and transmitting the routing decision further comprise:

generating an updated flow table for the second network device that includes the routing decision, wherein the updated flow table includes one or more entries, and wherein each entry in the updated flow table specifies a value in a data packet field and corresponding actions to be performed by the second device on future data packets with a matching value in a corresponding data packet field; and transmitting the updated flow table to the second network device.

3. The method of claim 1, wherein the routing decision is generated for routing the data packet over one of a plurality of virtual networks or firewall devices deployed on a physical network.

4. The method of claim 3, wherein the network device provides centralized routing decision generation for data routing in the one of the plurality of virtual networks.

5. The method of claim 1, further comprising:

generating a second flow table for a third network device based on the routing decision, wherein the second flow table instructs the third network device how to process data packets for a connection that includes the data packet.

6. The method of claim 1, wherein generating the routing decision for the data packet further comprises:

determining one or more data routing policies relevant to the application specific data;

determining a configuration of a virtual network over which the data is to be routed; and generating the routing decision for the network connection associated with the data packet based on the one or more data routing policies and the configuration of the virtual network.

7. The method of claim 1, wherein the network device and the second network device communicate with one another regarding the routing decision using a network virtualization communications protocol.

8. An article of manufacture having one or more non-transitory computer readable storage media storing executable instructions thereon which when executed cause a system to perform a method comprising:

receiving, at a network device from a second network device comprising a network firewall device, a data packet and application specific data extracted by the network firewall device from security processing and deep packet inspection of contents of the data packet, the data packet received from a client device having a new network connection for which there are no matching entries in a flow table of the network firewall device, wherein the application specific data determined by the network firewall device during the deep packet inspection and the security processing comprises data indicative of at least: an application that generated the data packet, content of the data packet extracted by the network firewall device during the deep packet inspection, and a purpose of data within the packet;

generating a routing decision by the network device for the new network connection associated with the data packet received from the client device, the routing decision generated based, at least in part, on application of a policy to a combination of the application, content, and purpose associated with the application specific data; and transmitting the routing decision from the network device to the network firewall device to enable the network firewall device to analyze the application specific data extracted from contents of the data packet and route the data packet based on the routing decision of the network device.

9. The article of manufacture of claim 8, wherein generating the routing decision and transmitting the routing decision further comprise:

generating an updated flow table for the second network device that includes the routing decision, wherein the updated flow table includes one or more entries, and wherein each entry in the updated flow table specifies a value in a data packet field and corresponding actions to be performed by the second device on future data packets with a matching value in a corresponding data packet field; and transmitting the updated flow table to the second network device.

10. The article of manufacture of claim 8, wherein the routing decision is generated for routing the data packet over one of a plurality of virtual networks or firewall devices deployed on a physical network.

11. The article of manufacture of claim 10, wherein the network device provides centralized routing decision generation for data routing in the one of the plurality of virtual networks.

12. The article of manufacture of claim 8, further comprising:

generating a second flow table for a third network device based on the routing decision, wherein the second flow table instructs the third network device how to process data packets for a connection that includes the data packet.

13. The article of manufacture of claim 8, wherein generating the routing decision for the data packet further comprises:

determining one or more data routing policies relevant to the application specific data;

determining a configuration of a virtual network over which the data is to be routed; and generating the routing decision for the network connection associated with the data packet based on the one or more data routing policies and the configuration of the virtual network.

14. The article of manufacture of claim 8, wherein the network device and the second network device communicate with one another regarding the routing decision using a network virtualization communications protocol.

15. A network device, comprising:

a memory; and a processor coupled with the memory to receive, at a network device from a second network device comprising a network firewall device, a data packet and application specific data extracted by the network firewall device from security processing and deep packet inspection of contents of the data packet, the data packet received from a client device having a new network connection for which there are no matching entries in a flow table of the network firewall device, wherein the application specific data determined by the network firewall device during the deep packet inspection and the security processing comprises data indicative of at least: an application that generated the data packet, content of the data packet extracted by the network firewall device during the deep packet inspection, and a purpose of data within the packet, generate a routing decision by the network device for the new network connection associated with the data packet received from the client device, the routing decision generated based, at least in part, on application of a policy to a combination of the application, content, and purpose associated with the application specific data, and transmit the routing decision from the network device to the network firewall device to enable the network firewall device to analyze the application specific data extracted from contents of the data packet and route the data packet based on the routing decision of the network device.

16. The network device of claim 15, wherein the processor to generate the routing decision and transmit the routing decision further comprises the processor to:

generate an updated flow table for the second network device that includes the routing decision, wherein the updated flow table includes one or more entries, and wherein each entry in the updated flow table specifies a value in a data packet field and corresponding actions to be performed by the second device on future data packets with a matching value in a corresponding data packet field, and transmit the updated flow table to the second network device.

17. The network device of claim 15, wherein the routing decision is generated for routing the data packet over one of a plurality of virtual networks or firewall devices deployed on a physical network.

18. The network device of claim 17, wherein the network device provides centralized routing decision generation for data routing in the one of the plurality of virtual networks.

19. The network device of claim 15, wherein the processor is further configured to:

generate a second flow table for a third network device based on the routing decision, wherein the second flow table instructs the third network device how to process data packets for a connection that includes the data packet.

20. The network device of claim 15, wherein the processor configured to generate the routing decision for the data packet further comprises the processor configured to:

determine one or more data routing policies relevant to the application specific data, determine a configuration of a virtual network over which the data is to be routed, and generate the routing decision for the network connection associated with the data packet based on the one or more data routing policies and the configuration of the virtual network.

21. The network device of claim 15, wherein the network device and the second network device communicate with one another regarding the routing decision using a network virtualization communications protocol.

* * * * *